United States Patent
Matsuyama (10) Patent No.: US 8,855,461 B2
(45) Date of Patent: Oct. 7, 2014

(54) MOVING IMAGE SHOOTING APPARATUS CAPABLE OF CHANGING FRAME RATE DURING SHOOTING, METHOD OF CONTROLLING THE MOVING IMAGE SHOOTING APPARATUS, AND STORAGE MEDIUM

(75) Inventor: Nobuyuki Matsuyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 204 days.

(21) Appl. No.: 13/402,015

(22) Filed: Feb. 22, 2012

(65) Prior Publication Data

US 2012/0213485 A1 Aug. 23, 2012

(30) Foreign Application Priority Data

Feb. 22, 2011 (JP) ................. 2011-035708

(51) Int. Cl.
*H04N 5/935* (2006.01)
*H04N 5/765* (2006.01)
*H04N 5/77* (2006.01)
*H04N 5/232* (2006.01)
*H04N 5/235* (2006.01)
*H04N 9/79* (2006.01)
*H04N 5/217* (2011.01)

(52) U.S. Cl.
CPC ........... *H04N 5/772* (2013.01); *H04N 5/23245* (2013.01); *H04N 5/2353* (2013.01); *H04N 5/2352* (2013.01); *H04N 9/7921* (2013.01); *H04N 5/217* (2013.01)
USPC ........................................... 386/210; 386/200

(58) Field of Classification Search
CPC .... H04N 5/217; H04N 5/23245; H04N 5/772
See application file for complete search history.

(56) References Cited

U.S. PATENT DOCUMENTS

| | | | |
|---|---|---|---|
| 2009/0147122 A1 | 6/2009 | Kato | |
| 2009/0195675 A1* | 8/2009 | Haneda | ..................... 348/240.99 |
| 2012/0257071 A1* | 10/2012 | Prentice | ..................... 348/220.1 |

FOREIGN PATENT DOCUMENTS

| | | |
|---|---|---|
| JP | 2008-099110 A | 4/2008 |
| JP | 2009-141834 A | 6/2009 |

* cited by examiner

*Primary Examiner* — Huy T Nguyen
(74) *Attorney, Agent, or Firm* — Rossi, Kimms & McDowell LLP (57) ABSTRACT

A technique enabling a moving image reduced in image disturbance to be recorded even when a frame rate is changed during shooting. In a moving image shooting apparatus, an image pickup device picks up an image of an object. An image synthesis section combines images picked up by the image pickup device into a composite image. A moving image is recorded in a storage medium using the image or the composite image. When an instruction for changing the frame rate of the moving image is issued, the moving image shooting apparatus performs control such that a frame rate transition time period is provided. During the transition time period, images are picked up at a first frame rate, and a composite image is generated at the first frame rate. Then, the composite image is recorded at a second frame rate lower than the first frame rate.

13 Claims, 9 Drawing Sheets

MOVING IMAGE SHOOTING APPARATUS CAPABLE OF CHANGING FRAME RATE DURING SHOOTING, METHOD OF CONTROLLING THE MOVING IMAGE SHOOTING APPARATUS, AND STORAGE MEDIUM

BACKGROUND OF THE INVENTION

1. Field of the Invention

The present invention relates to a moving image shooting apparatus, a method of controlling the same, and a storage medium, and more particularly to a technique for preventing image disturbance from occurring when a frame rate is changed during moving image shooting.

2. Description of the Related Art

In the case of photographing an object moving vigorously e.g. in a sport, as a moving image, it is desirable to perform shooting at a higher frame rate than usual so as to improve the quality of the moving image.

However, the amount of data of a moving image captured at a high frame rate is large with respect to recording time, and hence shootable time over which shooting can be performed, with respect to the capacity of a storage medium, is reduced. Further, moving image shooting performed at a high frame rate requires high-speed operation of a circuit including an image pickup device, which causes battery to be steeply consumed, which results in reduction of shootable time.

As a solution to the above problem, there has been proposed a method in which only a specific scene is captured at a high frame rate during shooting. On the other hand, there has also been proposed a method in which when an object moving gently is to be shot as a moving image, shooting is performed at a lower frame rate than usual to thereby prolong shootable time. For example, in Japanese Patent Laid-Open Publication No. 2008-99110, there has been proposed a technique that makes it possible to maintain balance between the quality of a moving image and shootable time by changeably controlling the frame rate according to the motion of an object during shooting. Further, in Japanese Patent Laid-Open Publication No. 2009-141834, there has been proposed a technique for reducing luminance change, in particular, out of changes in moving image quality which occurs across a frame rate change.

In the above-described conventional techniques, when the frame rate is changed during shooting, the exposure time of an image pickup device changes, which causes a difference in the luminance level of an image before and after the frame rate change. This luminance level difference is adjusted by automatic exposure (AE) control, but there is a problem of low responsiveness, since AE control involves mechanical operation. More specifically, the adjustment of the luminance level difference by AE control takes time corresponding to at least several frames, and hence there is a fear that the viewer perceives the adjustment as temporary image disturbance. As a solution to this problem, it can be envisaged to adjust the luminance level by analog gain adjustment.

However, gain is increased e.g. for shooting a dark object, causing deterioration of the S/N ratio, and again, there is a fear that the adjustment can also be perceived as image disturbance. Therefore, this solution is not effective enough.

SUMMARY OF THE INVENTION

The present invention provides a technique which makes it possible to record a moving image reduced in temporary image disturbance even when the frame rate is changed during shooting.

In a first aspect of the present invention, there is provided a moving image shooting apparatus comprising an image pickup unit configured to pick up an image of an object, a synthesis unit configured to combine a plurality of images picked up by the image pickup unit into a composite image, a recording unit configured to record a moving image in a storage medium using the image picked up by the image pickup unit or the composite image synthesized by the synthesis unit, a changing unit configured to issue an instruction for changing a frame rate of the moving image to be recorded in the storage medium, and a control unit configured to be operable when the changing unit gives the instruction for changing the frame rate of the moving image, to control the image pickup unit, the synthesis unit, and the recording unit, such that a frame rate transition time period is provided in which the image pickup unit picks up images at a first frame rate, the synthesis unit generates a composite image from the images picked up by the image pickup unit at the first frame rate, and the recording unit records the composite image synthesized by the synthesis unit, at a second frame rate lower than the first frame rate.

In a second aspect of the present invention, there is provided a method of controlling a moving image shooting apparatus including an image pickup unit configured to pick up an image of an object, a synthesis unit configured to combine a plurality of images picked up by the image pickup unit into a composite image, and a recording unit configured to record a moving image in a storage medium using the image picked up by the image pickup unit or the composite image synthesized by the synthesis unit, comprising issuing an instruction for changing a frame rate of the moving image to be recorded in the storage medium, and controlling, when the instruction for changing the frame rate of the moving image is issued, the image pickup unit, the synthesis unit, and the recording unit, such that a frame rate transition time period is provided in which the image pickup unit picks up images at a first frame rate, the synthesis unit generates a composite image from the images picked up by the image pickup unit at the first frame rate, and the recording unit records the composite image synthesized by the synthesis unit, at a second frame rate lower than the first frame rate.

In a third aspect of the present invention, there is provided a non-transitory computer-readable storage medium storing a computer-executable program for causing a computer to execute a method of controlling a moving image shooting apparatus including an image pickup unit configured to pick up an image of an object, a synthesis unit configured to combine a plurality of images picked up by the image pickup unit into a composite image, and a recording unit configured to record a moving image in a storage medium using the image picked up by the image pickup unit or the composite image synthesized by the synthesis unit, wherein the method comprises issuing an instruction for changing a frame rate of the moving image to be recorded in the storage medium, and controlling, when the instruction for changing the frame rate of the moving image is issued, the image pickup unit, the synthesis unit, and the recording unit, such that a frame rate transition time period is provided in which the image pickup unit picks up images at a first frame rate, the synthesis unit generates a composite image from the images picked up by the image pickup unit at the first frame rate, and the recording unit records the composite image synthesized by the synthesis unit, at a second frame rate lower than the first frame rate.

According to the present invention, it is possible to record a moving image reduced in temporary image disturbance even when a frame rate is changed during shooting.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
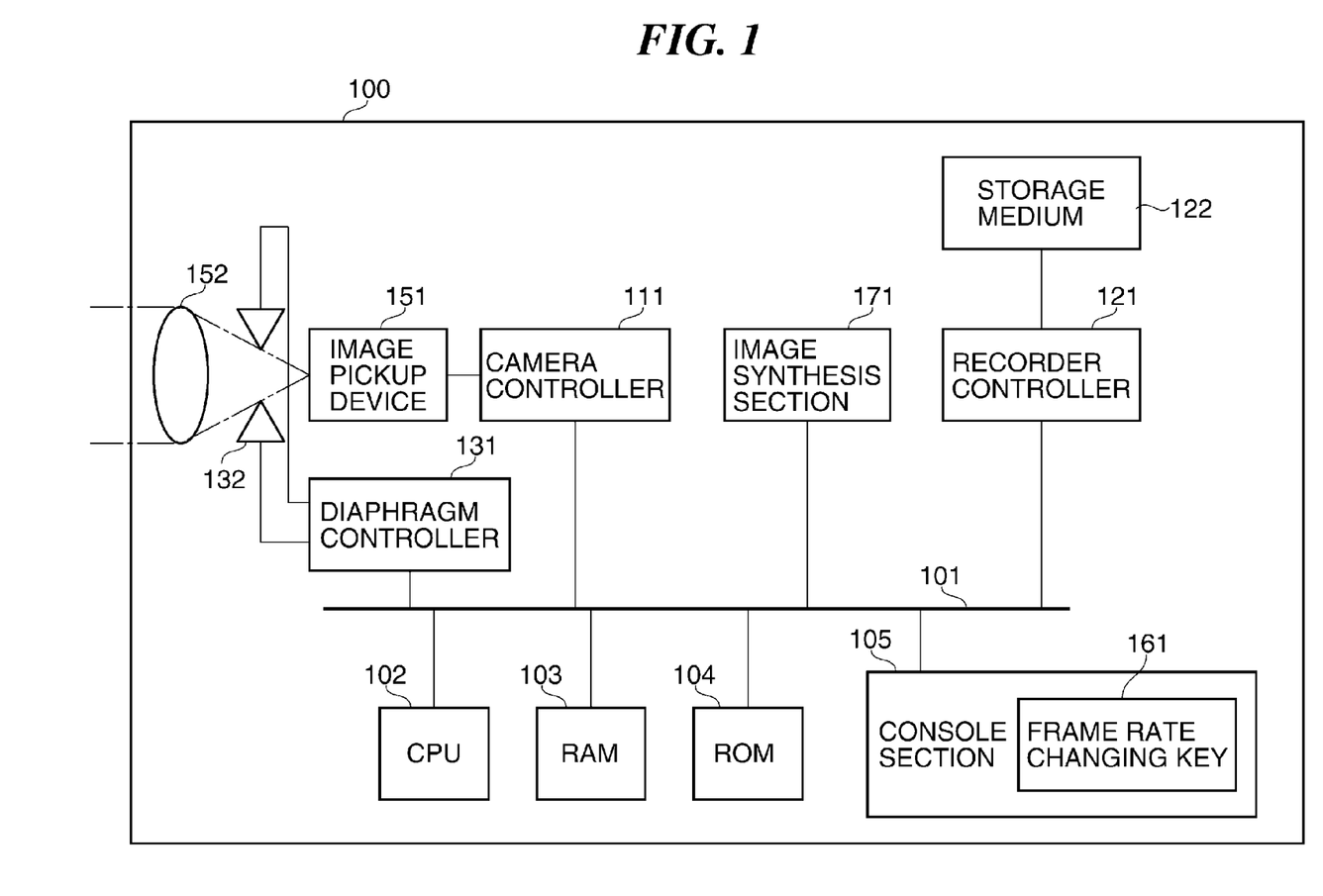
FIG. 1 is a schematic block diagram of a moving image shooting apparatus according to a first embodiment of the present invention.

FIG. 1 is a schematic block diagram of a moving image shooting apparatus according to a first embodiment of the present invention. In FIG. 1, functional blocks unrelated to the present invention are omitted.

Referring to FIG. 1, a CPU 102, a RAM 103, a ROM 104, a console section 105, a camera controller 111, a recorder controller 121, and a diaphragm controller 131 are connected to an internal bus 101 of the moving image shooting apparatus 100 in a manner accessible to each other.

The moving image shooting apparatus 100 is provided with an image pickup device 151. An object image entering through a lens 152 is exposed on the exposure surface of the image pickup device 151. A diaphragm 132 is disposed between the image pickup device 151 and the lens 152. The CPU 102 controls the aperture area of the diaphragm 132 according to a setting of the diaphragm controller 131, to thereby perform exposure control by adjusting the amount of light which is to reach the exposure surface.

The console section 105 includes not only operation keys (not shown), such as a mode dial, a shutter button, and an arrow key, but also a frame rate-changing key 161. In response to operations of these keys, the CPU 102 recognizes the start and end of shooting, setting of a shooting mode, and change of a frame rate, and causes the camera controller 111 and the recorder controller 121 to be set to predetermined settings to thereby control the operation of the moving image shooting apparatus 100.

An image synthesis section 171 performs image synthesis processing for adding and synthesizing a plurality of images into a single image. Further, the image synthesis section 171 performs digital gain processing for adjusting an image luminance level before synthesis prior to execution of the image synthesis processing.

Next, a brief description will be given of the shooting operation of the moving image shooting apparatus 100 configured as above.

First, a user sets a shooting mode and a frame rate by operating the console section 105, and then issues an instruction for starting shooting. In response to this, the camera controller 111 generates a vertical synchronization (VD) signal in a cycle corresponding to the frame rate for image pickup (hereinafter referred to as "the imaging frame rate"), and executes read and reset control of the image pickup device 151 in synchronism with the VD signal.

An image signal read out from the image pickup device 151 is an analog signal indicative of an accumulated charge amount, i.e. an exposure amount. The image signal is subjected to noise removal and analog gain adjustment, then converted from analog to digital, and written as signal data in the RAM 103.

In parallel with the writing of the signal data in the RAM 103, the camera controller 111 calculates the image luminance level of each frame image by integrating a signal value obtained after the analog-to-digital conversion in a partial area. This luminance level is read out by the CPU 102 in timing in which an interrupt is generated in synchronism with the VD signal, and is used for AE control for the diaphragm controller 131.

The recorder controller 121 reads out the data written in the RAM 103 by the camera controller 111 (hereinafter referred to as "the yet-to-be-encoded data"), in response to an instruction from the CPU 102, and encodes the yet-to-be-encoded data with a format and at a frame rate set in the shooting mode. The encoded data is stored in a storage medium 122 formed by a nonvolatile memory, such as a flash memory.

The moving image shooting apparatus 100 is capable of performing shooting under the control of the CPU 102 in a state where the imaging frame rate and a recording frame rate in the recorder controller 121 are different from each other.

The image synthesis section 171 reads out the yet-to-be-encoded data from the RAM 103 in response to an instruction from the CPU 102 earlier than the recorder controller 121, performs digital gain processing and image synthesis processing on the yet-to-be-encoded data, and writes the processed data back in the RAM 103. Then, the recorder controller 121 encodes and records the data having been processed by the image synthesis section 171.

Next, a description will be given, with reference to FIG. 2, of a method of driving the image pickup device, which is executed by the moving image shooting apparatus 100 of the first embodiment when the frame rate is changed from 15 fps to 60 fps during shooting.

Figure 2:
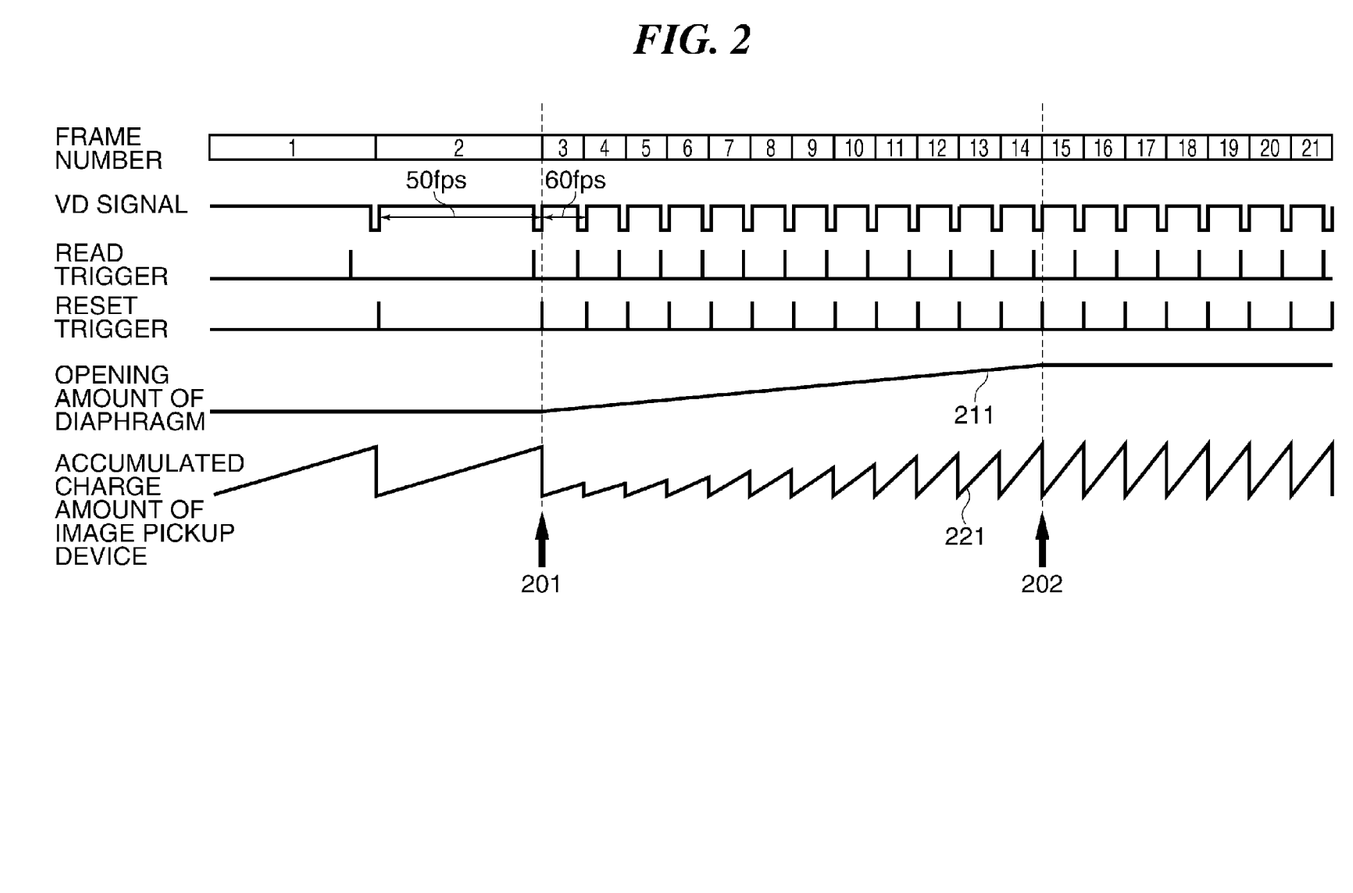
FIG. 2 is a diagram useful in explaining a method of driving an image pickup device, which is executed by the moving image shooting apparatus of the first embodiment when a frame rate is to be changed from 15 fps to 60 fps during shooting.

Referring to FIG. 2, the VD signal is a signal for designating read timing and reset timing for the image pickup device in synchronism with a read trigger and a reset trigger, respectively. The VD signal is output from the camera controller 111 to the image pickup device 151.

An instruction for changing the frame rate to 60 fps has been given via the frame rate-changing key 161 at time 201 in FIG. 2, and the imaging frame rate for frames having frame number 3 et seq. is changed from 15 fps to 60 fps.

The exposure time is changed to ¼ in accordance with the change of the imaging frame rate, and the luminance level is also changed to ¼. As a consequence, AE control works to increase the amount of opening of the diaphragm 132 as shown by a graph 211. Since the operation of the diaphragm 132 involves mechanical operation as mentioned hereinabove, a movement of the diaphragm 132 to a target position under AE control is completed at time 202 several frames after the time 201. The exposure time and the temporal change of the opening amount of the diaphragm 132 cause changes in the amount of charge accumulated in the image pickup device 151 as shown by a graph 221.

Figure 3:
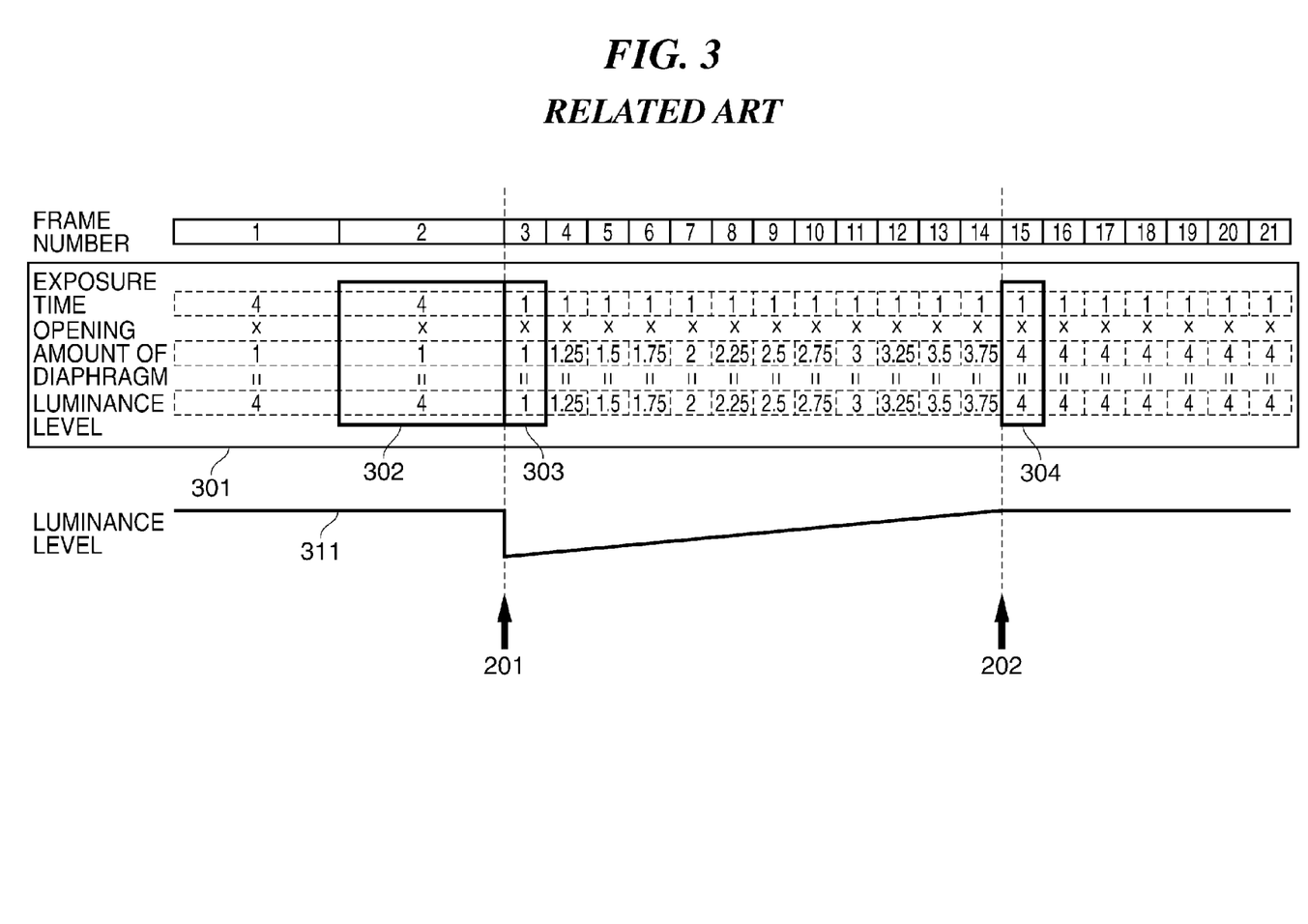
FIG. 3 is a diagram showing an example of luminance level change that occurs in a conventional moving image shooting apparatus when the frame rate is changed from low to high.

FIG. 3 shows how the luminance level of each of frame images that are recorded in the storage medium 122 changes in the conventional moving image shooting apparatus which is not provided with the image synthesis section 171.

In FIG. 3, the control of the image pickup device 151 and AE control are the same as described with reference to FIG. 2, and therefore it is assumed that an instruction for changing the frame rate is given at time 201, and the stopping-down operation of the diaphragm 132 is completed at time 202.

In a box 301, there are shown an exposure time and a diaphragm opening amount associated with each frame image and a luminance level obtained from the product of the exposure time and the diaphragm opening amount defined as relative values. For example, an exposure time associated with frame number 2 is 4 (see a box 302 in FIG. 3), whereas an exposure time associated with frame number 3 is 1 (see a box 303 in FIG. 3).

However, the stopping-down operation of the diaphragm 132 by AE control involves mechanical operation as mentioned hereinbefore, and hence the responsivity is low, so that the diaphragm opening amount associated with the frame number 3 and that associated with the frame number 2 are both 1. As a consequence, the luminance level as a product of the exposure time and the diaphragm opening amount is 4 for the frame number 2 but 1 for the frame number 3.

At time 202 when the stopping-down operation of the diaphragm 132 is completed, the exposure time and the diaphragm opening amount are 1 and 4, respectively, as shown in a box 304 in FIG. 3. As a consequence, the luminance level is 4 which is equal to the value in the box 302 before the imaging frame rate is changed. Reference numeral 311 indicates the temporal change of the luminance level in the form of a graph. As is apparent from the graph 311, the luminance level sharply changes at time 201. More specifically, the image suddenly becomes dark at time 201, which is perceived as image disturbance.

Next, a description will be given of control performed in a case where the frame rate is changed from 15 fps to 60 fps during shooting in the moving image shooting apparatus 100 of the present invention.

The CPU 102 instructs the image synthesis section 171 to perform digital gain processing and image synthesis processing on yet-to-be-encoded data only during a time period from time 201 to time 202 (hereinafter referred to as "the frame rate transition time period") in FIG. 2. At this time, the yet-to-be-encoded data is read out prior to encoding and recording by the recorder controller 121 as described hereinbefore.

Further, during the frame rate transition time period, the CPU 102 instructs the recorder controller 121 to encode and record the data processed by the image synthesis section 171.

The length of the frame rate transition time period is determined based on a frame rate change ratio and the operation speed of a diaphragm motor (not shown) for use in the stopping-down operation of the diaphragm 132. First, the CPU 102 calculates an amount of change in the exposure time based on the frame rate change ratio, and obtains an AE control target value of the diaphragm opening amount of the diaphragm 132 to compensate for the change in the exposure time. A difference between the AE control target value and the diaphragm opening amount of the diaphragm 132 at the time when the frame rate change instruction is issued is calculated as a diaphragm opening change amount, and a time period taken for the diaphragm motor to complete a stopping-down operation of the diaphragm 132 corresponding to the diaphragm opening change amount is determined as a shortest possible length of the frame rate transition time period. The actual frame rate transition time period has a length not shorter than the shortest length, and is equal to a length in units of length of each frame at the time.

A frame rate-changing control process for executing the above-described control will be described with reference to FIG. 4.

Figure 4:
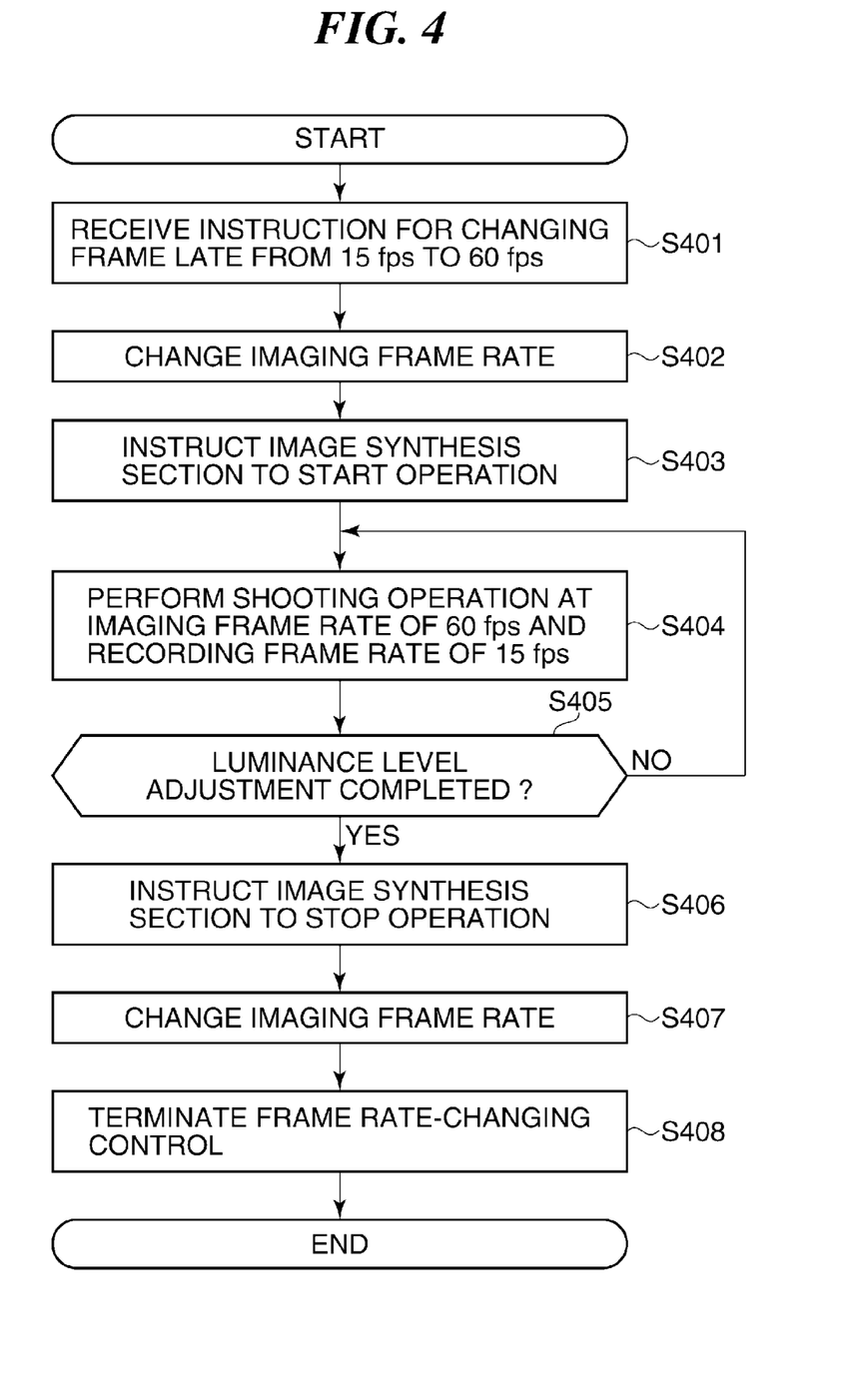
FIG. 4 is a flowchart of a frame rate-changing control process for changing the frame rate from low to high, which is executed by the moving image shooting apparatus of the first embodiment.

Referring to FIG. 4, upon receipt of an instruction for changing the frame rate from 15 fps to 60 fps via the frame rate-changing key 161 e.g. at time 201 in FIG. 2 (step S401), the CPU changes the imaging frame rate to 60 fps (step S402).

Then, the CPU 102 instructs the image synthesis section 171 to start operation (step S403). In doing this, the number of images to be used for image synthesis by the image synthesis section 171 is set to a number obtained by dividing a higher frame rate A of the two frame rates A and B before and after the frame rate change by the lower frame rate B, i.e. set to A/B. In the present embodiment, since A=60 fps and B=15 fps, four images (60/15=4) are combined into a single composite image.

Further, the recorder controller 121 processes data having been processed by the image synthesis section 171, and hence the frame rate used during recording of the data in the storage medium 122 at this time (hereinafter referred to as "the recording frame rate") remains 15 fps. The shooting operation is continued at an imaging frame rate of 60 fps (an example of a first frame rate) and a recording frame rate of 15 fps (an example of a second frame rate) until the adjustment of the luminance level by AE control is completed at time 202 in FIG. 2 (step S404).

Figure 5:
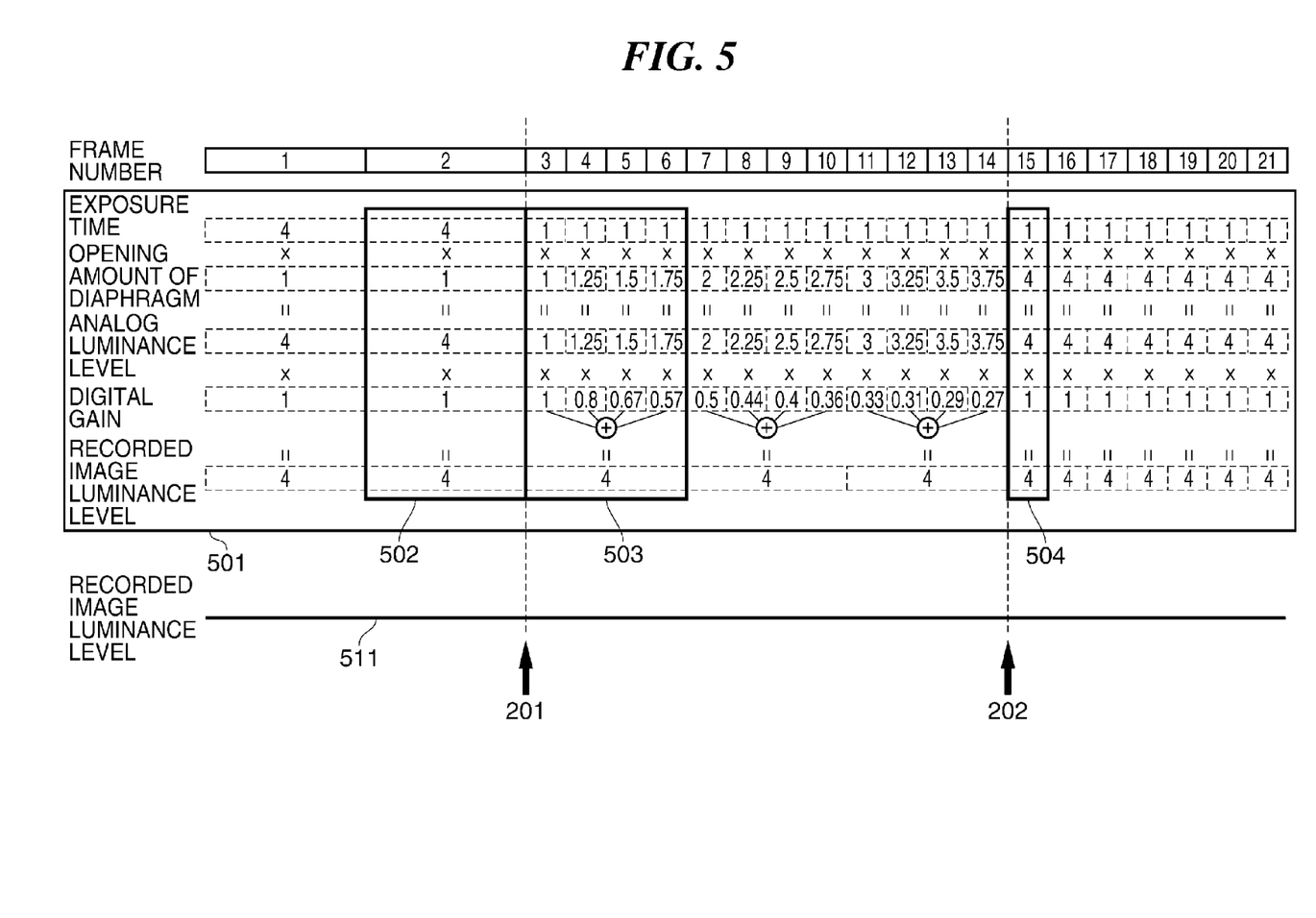
FIG. 5 is a diagram showing an example of luminance level change that occurs when the frame rate is changed from low to high in the frame rate-changing control process in FIG. 4.

When the adjustment of the luminance level is completed (YES to a step S405), the CPU 102 instructs the image synthesis section 171 to stop operation (step S406). Further, the CPU 102 instructs the recorder controller 121 to change the recording frame rate to 60 fps (step S407), followed by terminating the frame rate-changing control process (step S408). FIG. 5 shows in detail how the luminance level changes at this time.

In a box 501 in FIG. 5, there are shown relative values of luminance level of respective frame images subjected to digital gain processing and image synthesis processing by the image synthesis section 171.

Taking a box 502 associated with frame number 2 in FIG. 5 as an example, a frame image associated with the frame number 2 has not been processed by the image synthesis section 171, and hence the frame image is not influenced by the digital gain processing or the image synthesis processing, so that values in the box 502 are the same as those in the box 302 in FIG. 3. On the other hand, frame images, shown in a box 503, associated with respective frame numbers 3 to 6 have their luminance levels adjusted by digital gain processing and then the frame images are added and combined into one-frame image data having a luminance level of 4. In doing this, a digital gain value is controlled such that the value of the right side of the following equation becomes equal to a luminance level of 4 immediately before the issuing of the frame rate change instruction:

(unchanged luminance level)=(exposure time)×(diaphragm opening amount of diaphragm 132)× (digital gain)×(number of images for synthesis)

For example, a digital gain value associated with the frame number 4 can be obtained by the following equation:

(unchanged luminance level: 4)/(exposure time:1)× (diaphragm opening amount of diaphragm 132: 1.25)×(number of images to be combined: 4)=0.8

In this case, the diaphragm opening amount of diaphragm 132 is progressively increased by AE control, and hence the digital gain suppresses the image from being made progressively brighter by the increase in the diaphragm opening amount of diaphragm 132. Since the processing by the image synthesis section 171 is not executed outside the frame rate transition time period as described hereinbefore, values shown in a box 504 in FIG. 5 in association with frame number 15 are the same as those in the box 304 in FIG. 3. Reference numeral 511 in FIG. 5 indicates the temporal change of the luminance level in the form of a graph. As is apparent from the graph 511, the change of the luminance level at time 201, shown in the graph 311 in FIG. 3, is suppressed by the processing of the image synthesis section 171 in the present embodiment. Thus, image disturbance is prevented from occurring when the frame rate is changed during shooting.

Now, a detailed description will be given of a method of determining the length of the frame rate transition time period in the present embodiment.

The exposure time becomes $15/60$ seconds=$1/4$ seconds, so that AE control works to quadruple the diaphragm opening amount of the diaphragm 132 so as to compensate for reduction of the exposure time. That is, from the difference between the diaphragm opening amount "1" of the diaphragm 132 at time 201 when the change instruction is issued and the diaphragm opening amount "4" of the diaphragm 132 at time 202 when AE control is completed, i.e. when the transition time period elapses, the opening change amount is calculated as 3. The length of the frame rate transition time period is required to be, for the convenience of synthesis processing, in units of length of each frame associated with the lower one of the respective two frame rates A and B before and after the frame rate change, and therefore in the present embodiment, it is required to be calculated as a length in units of $1/15$ seconds. Therefore, assuming that from the operating limit speed of the diaphragm motor, it takes 0.15 seconds at shortest to complete the stopping-down operation of the diaphragm 132 corresponding to the opening change amount, the length of the actual frame rate transition time period can be determined by the following equation:

(shortest time taken before completion of operation of the diaphragm 132:0.15 seconds)/(unit frame time of lower frame rate before or after frame rate change:$1/15$ seconds)=(shortest possible length of frame rate transition time period:2.25 [frames])

In the present embodiment, this value is rounded up, whereby the length of the actual frame rate transition time period is set to a length corresponding to 3 frames at 15 fps. It is possible to set the frame rate transition time period to be longer than this. However, if time 202 is set to be later, the change of the frame rate of images recorded is delayed, and therefore, in the present embodiment, the value obtained by rounding-up as above is used. Further, in the present embodiment, the operation speed of the diaphragm motor is controlled such that the diaphragm 132 completes the stopping-down operation just in the transition time period (corresponding to three frames in the present example). Of course, the operation speed of the diaphragm motor may be controlled such that the diaphragm 132 completes the stopping-down operation in the shortest time period. In this case, the digital gain is adjusted to thereby generate such a composite image as in the above-described embodiment.

As described above, according to the present embodiment, the frame rate is configured to be changeable, and a time period from issuing of a frame rate change instruction during shooting to completion of luminance level adjustment by AE control is set as a frame rate transition time period during which an image subjected to digital gain processing and synthesis processing is recorded. This makes it possible to prevent the image recorded from being adversely affected by a change in the luminance level within the frame rate transition time period, to thereby record a moving image reduced in temporary image disturbance.

Although in the present embodiment, the frame rate is changed by user operation both at the start of shooting and during the shooting, this is not limitative, but the frame rate may be automatically determined e.g. based on scene discrimination. For example, when a moving object is detected using a moving object detection circuit, the frame rate is set to a high rate of 60 fps, and when no moving object is detected, the frame rate is automatically changed to a low rate of 15 fps. In this case, the frame rate transition time period is set as in the present embodiment in timing synchronous with the automatic frame rate change.

In the first embodiment, the frame rate is changed from a low frame rate to a high frame rate. When changing the frame rate from a low rate to a high rate, if the above-described control within the transition time period is performed, the exposure time of the image pickup device changes in timing in which the frame rate transition time period starts, so that normal AE control works. On the other hand, when the frame rate is changed from a high rate to a low rate, the exposure time of the image pickup device does not change in timing in which the frame rate transition time period starts, so that normal AE control does not work. In short, in changing the frame rate, the diaphragm cannot be appropriately changed by normal AE control.

AE control during the frame rate transition time period from a high frame rate to a low frame rate is a second object of the present invention. In the following, a description will be given of a second embodiment for providing a solution to the above object. The configuration of a moving image shooting apparatus according to the second embodiment is the same as that of the moving image shooting apparatus of the first embodiment in FIG. 1, and therefore description of corresponding elements is omitted by using the same reference numerals.

A description will be given, with reference to FIG. 6, of an image pickup device driving method which is executed in the case of changing the frame rate from 60 fps to 15 fps in the moving image shooting apparatus 100 according to the second embodiment.

Figure 6:
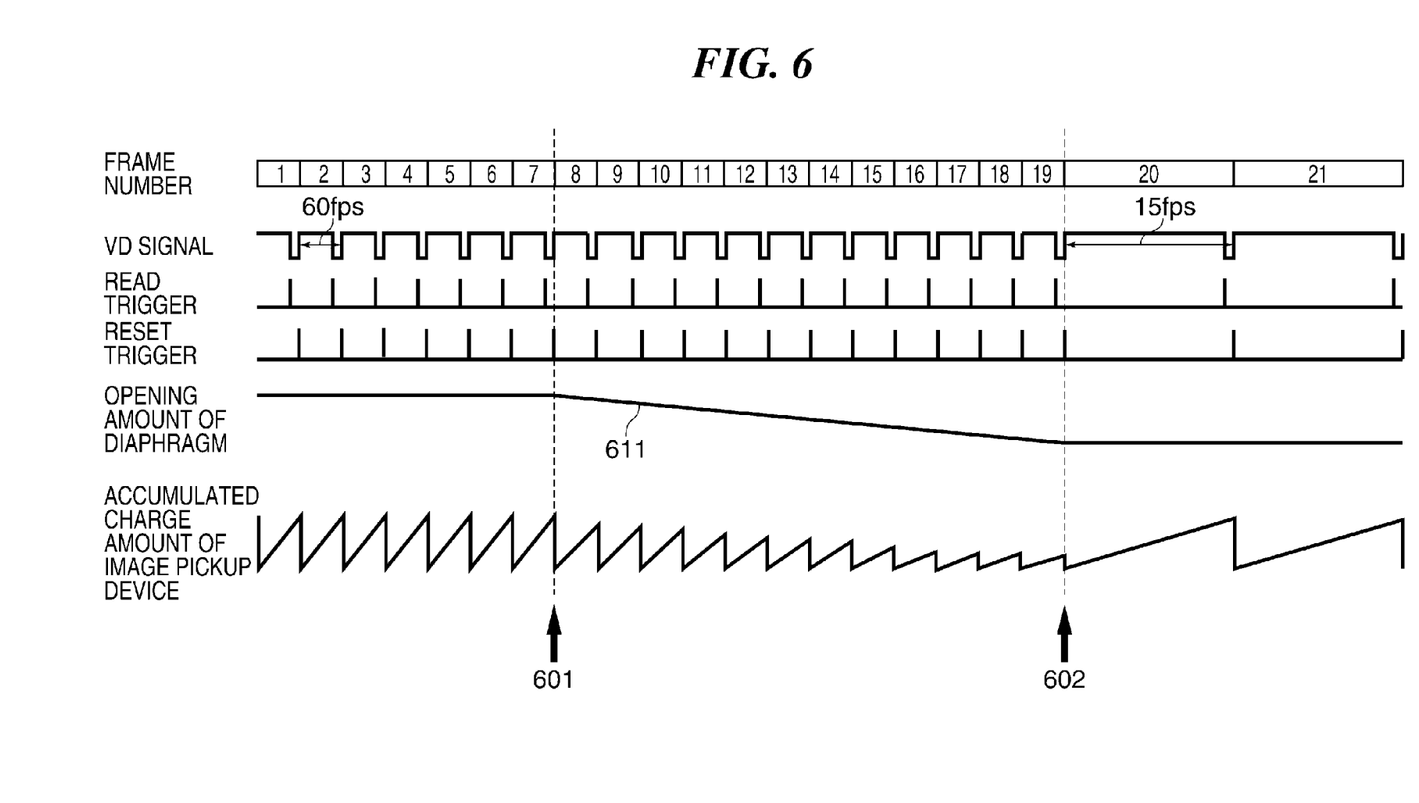
FIG. 6 is a diagram useful in explaining a method of driving an image pickup device, which is executed by a moving image shooting apparatus according to a second embodiment of the present invention, when a frame rate is to be changed from 60 fps to 15 fps during shooting.

When an instruction for changing the frame rate to 15 fps is issued using the frame rate-changing key 161 at time 601 in FIG. 6, the CPU 102 immediately changes the recording frame rate to 15 fps without changing the imaging frame rate. Further, the CPU 102 changes the operation mode of AE control within the frame rate transition time period to a second control mode different from a first control mode executed in the normal time other than the frame rate transition time period. In the first control mode, the diaphragm 132 is controlled according to a control signal generated based on a read luminance level value, whereas in the second control mode, a value is used which is obtained by multiplying the luminance level value by a conversion coefficient (gain) corresponding to a change in the frame rate. More specifically, in the first control mode, the conversion coefficient is set to 1, whereas in the second control mode, the conversion coefficient is set to a value obtained by dividing the higher frame rate of the two frame rates A and B before and after the frame rate change by the lower frame rate B (60/15=4 in the present embodiment). This causes the diaphragm opening amount of the diaphragm 132 to be changed as shown by a graph 611 in FIG. 6.

When the operation of the diaphragm 132 is completed at time 602 in FIG. 6, the CPU 102 returns the operation mode of AE control to the first control mode, and performs shooting for frames having frame number 20 et seq. with the imaging frame rate held at 15 fps. In the FIG. 6 case, a period from time 601 to time 602 is set as the frame rate transition time period, and the CPU 102 instructs the image synthesis section 171 to perform digital gain processing and image synthesis processing on yet-to-be-encoded data prior to encoding and recording by the recorder controller 121, as in the case described hereinbefore.

Further, in the frame rate transition time period, the CPU 102 instructs the recorder controller 121 to encode and record the data having been processed by the image synthesis section 171.

By thus changing the operation mode of AE control different between within and outside the frame rate transition time period, it is possible to cause the exposure time of the image pickup device to appear to be changed, in a pseudo fashion, to thereby appropriately change the opening amount of the diaphragm when the frame rate is changed.

A frame rate-changing control process for executing the above-described control by the moving image shooting apparatus 100 according to the second embodiment will be described with reference to FIG. 7.

Figure 7:
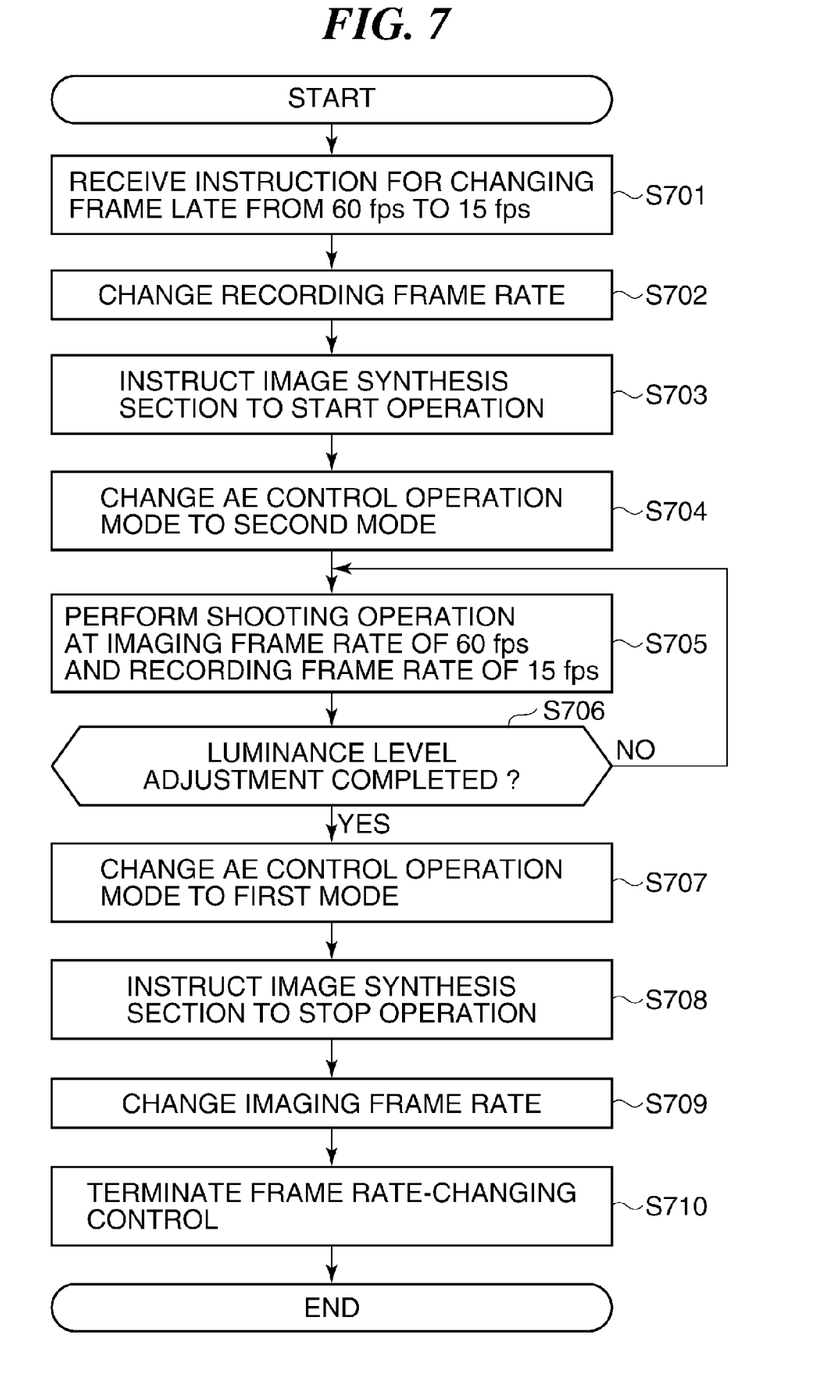
FIG. 7 is a flowchart of a frame rate-changing control process for changing the frame rate from high to low, which is executed by the moving image shooting apparatus of the second embodiment.

Referring to FIG. 7, upon receipt of an instruction for changing the frame rate from 60 fps to 15 fps via the frame rate-changing key 161 at time 601 in FIG. 6 (step S701), the CPU 102 changes the recording frame rate to 15 fps (step S702).

Then, the CPU 102 instructs the image synthesis section 171 to start operation (step S703). In doing this, in the same manner as described in the first embodiment, the number of images to be used for image synthesis by the image synthesis section 171 is set to a number obtained by dividing the higher frame rate A of the two frame rates A and B before and after the frame rate change by the lower frame rate B. In the present embodiment, since A=60 fps and B=15 fps, four images (60/15=4) are combined into a single composite image.

The recorder controller 121 processes data having processed by the image synthesis section 171, and hence the recording frame rate at this time point is 15 fps. Further, the CPU 102 changes the operation mode of AE control to the second control mode (step S704). The shooting operation is continued at an imaging frame rate of 60 fps (an example of the first frame rate) and an recording frame rate of 15 fps (an example of the second frame rate) until the adjustment of the luminance level by AE control is completed at time 602 in FIG. 6 (step S705).

Figure 8:
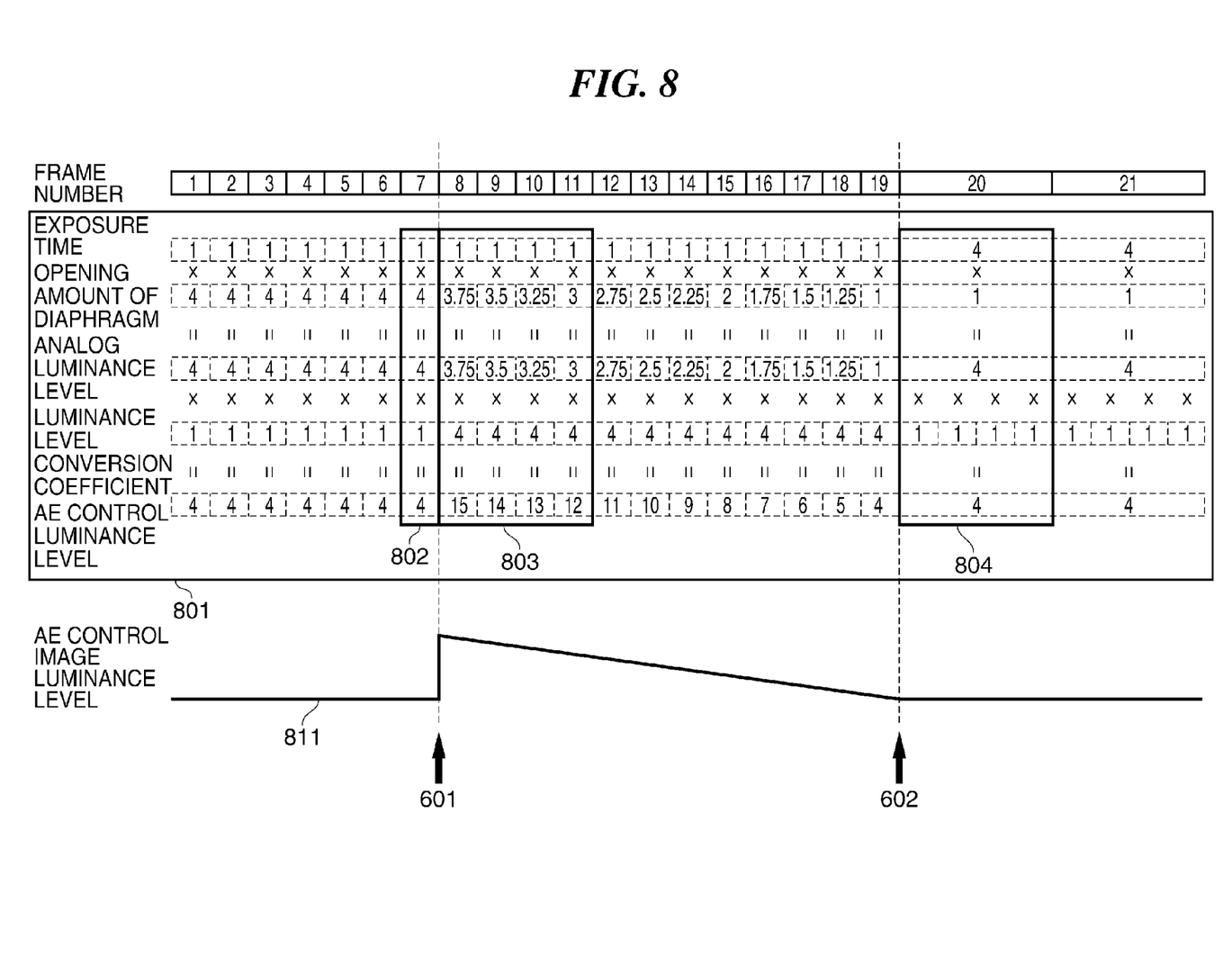
FIG. 8 is a diagram showing an example of a change in luminance level for AE control, which occurs when the frame rate is changed from high to low in the frame rate-changing control process in FIG. 7.
Figure 9:
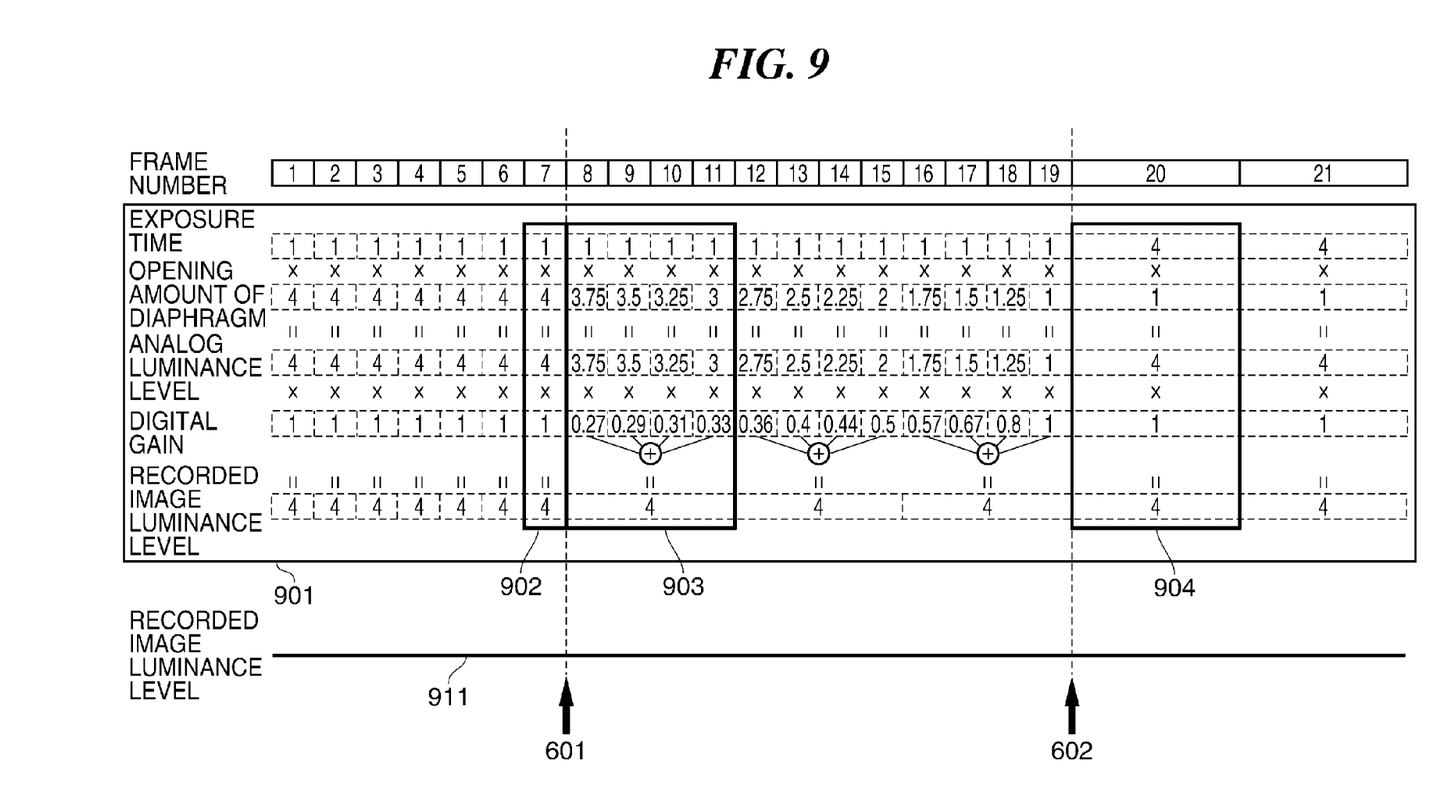
FIG. 9 is a diagram showing an example of a change in recorded image luminance level, which occurs when the frame rate is changed from high to low in the frame rate-changing control process in FIG. 7.

When the adjustment of the luminance level is completed (YES to a step S706), the CPU 102 changes the operation mode of AE control to the first control mode (step S707) and then instructs the image synthesis section 171 to stop operation (step S708). Thereafter, the CPU 102 instructs the camera controller 111 to change the imaging frame rate to 15 fps (step S709), followed by terminating the frame rate changing control process (step S710). FIGS. 8 and 9 show how the AE control luminance level and the luminance level of a recorded image change, respectively.

In a box 801 in FIG. 8, there are shown relative values of luminance level for use in AE control. Taking a box 802 associated with frame number 7 in FIG. 8 as an example, a luminance level conversion coefficient for a frame associated with the frame number 7 is set to 1, and therefore a luminance level for use in AE control is calculated as 4, i.e. the same value as the luminance level value of the sensor-read analog signal. On the other hand, in frames in a box 803 in FIG. 8, which are associated with respective frame numbers 8 to 11, the image suddenly becomes too bright for AE control after luminance level conversion, and AE control works to close the diaphragm 132 so as to cope with this change. The luminance level conversion coefficient is set to 1 in timing synchronous with completion of the luminance level adjustment by AE control, and at the same time, the imaging frame rate is set to 15 fps. Therefore, an AE control luminance level associated with frame number 20 in a box 804 in FIG. 8 becomes equal to the value in the box 802 in FIG. 8. Reference numeral 811 indicates the temporal change of the AE control luminance level in the form of a graph. As shown by the graph 811, luminance level conversion is executed to cause the image to appear to be bright in a pseudo manner, whereby AE control is forcibly caused to work.

In a box 901 in FIG. 9, there are shown relative values of luminance level of the recorded image. Taking a box 902 associated with a frame number 7 in FIG. 9 as an example, a frame image associated with the frame number 7 is not processed by the image synthesis section 171, so that the frame image is not influenced by the digital gain processing or the image synthesis processing, and therefore the luminance level is 4. On the other hand, frame images shown in a box 903 in FIG. 9 associated with respective frame numbers 8 to 11 are subjected to the digital gain processing and image synthesis processing, similarly to the first embodiment, whereby one-frame image data having a luminance level of 4 is obtained. In this case, however, the diaphragm opening amount of diaphragm 132 is progressively reduced by AE control, and hence the digital gain suppresses the image from being made progressively darker by the decrease in the diaphragm opening amount of diaphragm 132. The processing by the image synthesis section 171 is not executed outside the frame rate transition time period as described hereinbefore, and therefore a luminance level value shown in a box 904 in FIG. 9 in association with frame number 20 is the same as that in the box 902 in FIG. 9. Reference numeral 911 in FIG. 9 shows the temporal change of the luminance level in the form of a graph. As is apparent from the graph 911, a change in luminance level caused by a change in frame rate is suppressed by the luminance level conversion processing in the present embodiment. As a consequence, image disturbance is prevented from occurring when the frame rate is changed during shooting.

In the present embodiment, since the frame rate of an image to be recorded is changed at time 601 when the frame rate change instruction is issued, no problem occurs even if the frame rate transition time period is prolonged. Therefore, the frame rate transition time period may be adaptively prolonged according to the ambient conditions. More specifically, when there is a possibility of diaphragm motor sound being recorded as noise in quiet surroundings or when it is desired that a change in depth of field due to change in the diaphragm 132 is made inconspicuous, the transition time period may be made longer by reducing the diaphragm motor speed.

As described above, according to the second embodiment, in addition to the control in the first embodiment executed, the operation mode of AE control within the transition time period is changed. This makes it possible to cause the exposure time of the image pickup device to appear to be changed, in a pseudo fashion, to thereby appropriately change the opening amount of the diaphragm when the frame rate is changed. As a consequence, it is possible to prevent an image recorded from being adversely affected by a luminance level change that occurs within the transition time period, and record a moving image reduced in temporary image disturbance.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

Further, it is to be understood that the functions of either of the above-described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above-described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2011-035708 filed Feb. 22, 2011, which is hereby incorporated by reference herein in its entirety.

What is claimed is:

1. A moving image shooting apparatus comprising:
    an image pickup unit configured to pick up an image of an object;
    a synthesis unit configured to combine a plurality of images picked up by said image pickup unit into a composite image;
    a recording unit configured to record a moving image in a storage medium using the image picked up by said image pickup unit or the composite image synthesized by said synthesis unit;
    a changing unit configured to issue an instruction for changing a frame rate of the moving image to be recorded in the storage medium; and
    a control unit configured to be operable when said changing unit gives the instruction for changing the frame rate of the moving image, to control said image pickup unit, said synthesis unit, and said recording unit, such that a frame rate transition time period is provided in which:
    said image pickup unit picks up images at a first frame rate,
    said synthesis unit generates a composite image from the images picked up by said image pickup unit at the first frame rate, and
    said recording unit records the composite image synthesized by said synthesis unit, at a second frame rate lower than the first frame rate.

2. The moving image shooting apparatus according to claim 1, wherein said changing unit can change the frame rate of the moving image from the first frame rate to the second frame rate.

3. The moving image shooting apparatus according to claim 1, wherein said changing unit can change the frame rate of the moving image from the second frame rate to the first frame rate.

4. The moving image shooting apparatus according to claim 3, wherein in the frame rate transition time period, said diaphragm control unit makes the operation speed of said diaphragm control unit lower than in a time period other than the frame rate transition time period.

5. The moving image shooting apparatus according to claim 1, wherein said image pickup unit includes a diaphragm,
    the moving image shooting apparatus further comprising a diaphragm control unit configured to control said diaphragm of said image pickup unit, and
    wherein a length of the frame rate transition time period is determined based on respective frame rates before and after a change in frame rate to be made in response to the instruction from said changing unit, and an operation speed of said diaphragm.

6. The moving image shooting apparatus according to claim 1, wherein said image pickup unit includes a diaphragm,
    the moving image shooting apparatus further comprising a diaphragm control unit configured to control said diaphragm of said image pickup unit, and
    wherein in the frame rate transition time period, said diaphragm control unit controls said diaphragm of said image pickup unit in a different control mode from a normal control mode for other than the frame rate transition time period.

7. The moving image shooting apparatus according to claim 1, wherein said diaphragm control unit controls said diaphragm according to a control signal generated based on a luminance level of an image picked up by said image pickup unit, and
    wherein in the frame rate transition time period, a signal obtained by multiplying the luminance level by a gain corresponding to a change in frame rate by said changing unit is used as the control signal.

8. A method of controlling a moving image shooting apparatus including an image pickup unit configured to pick up an image of an object, a synthesis unit configured to combine a plurality of images picked up by the image pickup unit into a composite image, and a recording unit configured to record a moving image in a storage medium using the image picked up by the image pickup unit or the composite image synthesized by the synthesis unit, comprising:
    issuing an instruction for changing a frame rate of the moving image to be recorded in the storage medium; and
    controlling, when the instruction for changing the frame rate of the moving image is issued, the image pickup unit, the synthesis unit, and the recording unit, such that a frame rate transition time period is provided in which:

the image pickup unit picks up images at a first frame rate, the synthesis unit generates a composite image from the images picked up by the image pickup unit at the first frame rate, and the recording unit records the composite image synthesized by the synthesis unit, at a second frame rate lower than the first frame rate.

9. A non-transitory computer-readable storage medium storing a computer-executable program for causing a computer to execute a method of controlling a moving image shooting apparatus including an image pickup unit configured to pick up an image of an object, a synthesis unit configured to combine a plurality of images picked up by the image pickup unit into a composite image, and a recording unit configured to record a moving image in a storage medium using the image picked up by the image pickup unit or the composite image synthesized by the synthesis unit, wherein the method comprises:

issuing an instruction for changing a frame rate of the moving image to be recorded in the storage medium; and controlling, when the instruction for changing the frame rate of the moving image is issued, the image pickup unit, the synthesis unit, and the recording unit, such that a frame rate transition time period is provided in which:

the image pickup unit picks up images at a first frame rate, the synthesis unit generates a composite image from the images picked up by the image pickup unit at the first frame rate, and the recording unit records the composite image synthesized by the synthesis unit, at a second frame rate lower than the first frame rate.

10. The moving image shooting apparatus according to claim 1, wherein said control unit controls said image pickup unit to pick up images at the second frame rate and controls said recording unit to record the picked-up images at the second frame rate without a composition by said synthesis unit.

11. A moving image shooting apparatus comprising:

an image pickup unit configured to pick up an image of an object;

a synthesis unit configured to combine a plurality of images picked up by said image pickup unit into a composite image;

a recording unit configured to record a moving image in a storage medium using the image picked up by said image pickup unit or the composite image synthesized by said synthesis unit;

a changing unit configured to issue an instruction for changing a frame rate of the moving image to be recorded in the storage medium; and a control unit configured to be operable in a case where said changing unit gives the instruction for changing the frame rate of the moving image, to control said image pickup unit to pick up images at a first frame rate, to control said synthesis unit to generate a composite image from the images picked up by said image pickup unit at the first frame rate, and to control said recording unit to record the composite image synthesized by said synthesis unit, at a second frame rate lower than the first frame rate.

12. A method of controlling a moving image shooting apparatus, the method comprising:

an image pickup step of picking up an image of an object;

a synthesis step of combining a plurality of images picked up by said image pickup step into a composite image;

a recording step of recording a moving image in a storage medium using the image picked up by said image pickup step or the composite image synthesized by said synthesis step;

a changing step of issuing an instruction for changing a frame rate of the moving image to be recorded in the storage medium; and a controlling step of, in a case where said changing step gives the instruction for changing the frame rate of the moving image, to control said image pickup step to pick up images at a first frame rate, controlling said synthesis step to generate a composite image from the images picked up by said image pickup step at the first frame rate, and controlling said recording step to record the composite image synthesized by said synthesis step, at a second frame rate lower than the first frame rate.

13. A non-transitory computer-readable storage medium storing a computer- executable program for causing a computer to execute a method of controlling a moving image shooting apparatus, the method comprising:

an image pickup step of picking up an image of an object;

a synthesis step of combining a plurality of images picked up by said image pickup step into a composite image;

a recording step of recording a moving image in a storage medium using the image picked up by said image pickup step or the composite image synthesized by said synthesis step;

a changing step of issuing an instruction for changing a frame rate of the moving image to be recorded in the storage medium; and a controlling step of, in a case where said changing step gives the instruction for changing the frame rate of the moving image, to control said image pickup step to pick up images at a first frame rate, controlling said synthesis step to generate a composite image from the images picked up by said image pickup step at the first frame rate, and controlling said recording step to record the composite image synthesized by said synthesis step, at a second frame rate lower than the first frame rate.

* * * * *